(12) United States Patent
Hubert et al.

(10) Patent No.: US 6,523,241 B1
(45) Date of Patent: Feb. 25, 2003

(54) METHOD FOR MANUFACTURING A FIBRE OPTIC MALE CONTACT

(75) Inventors: Jean-Claude Hubert, Morges (CH); Jean-Philippe Barbey, Promasens (CH); Alan Brooks, Uckfield (GB)

(73) Assignee: Interlemo Holding S.A., Saint-Sulpice (CH)

( * ) Notice: Subject to any disclaimer, the term of this patent is extended or adjusted under 35 U.S.C. 154(b) by 0 days.

(21) Appl. No.: 09/644,319

(22) Filed: Aug. 23, 2000

(30) Foreign Application Priority Data

Aug. 25, 1999 (EP) .............................................. 99116618

(51) Int. Cl.[7] .............................................. B23P 11/02
(52) U.S. Cl. .............................. 29/451; 385/78; 385/86
(58) Field of Search ...................... 29/450, 451; 385/86, 385/78, 79, 76, 61

(56) References Cited

U.S. PATENT DOCUMENTS

| | | | | |
|---|---|---|---|---|
| 4,168,109 A | * | 9/1979 | Dumire ........................ | 385/60 |
| 4,279,467 A | * | 7/1981 | Borsuk et al. ................. | 385/65 |
| 4,336,977 A | | 6/1982 | Monagham et al. | |
| 4,614,401 A | * | 9/1986 | Strait, Jr. ..................... | 385/64 |
| 4,718,745 A | * | 1/1988 | Strait, Jr. ..................... | 385/64 |
| 5,121,455 A | * | 6/1992 | Palecek ........................ | 385/69 |
| 5,134,677 A | * | 7/1992 | Leung et al. .................. | 385/84 |
| 5,251,279 A | * | 10/1993 | Shibata et al. ................. | 385/86 |
| 5,276,752 A | * | 1/1994 | Gugelmeyer et al. .......... | 385/69 |
| 5,321,784 A | * | 6/1994 | Cubukciyan et al. .......... | 385/78 |
| 5,428,703 A | * | 6/1995 | Lee ............................. | 385/78 |
| 5,515,466 A | * | 5/1996 | Lee ............................. | 385/78 |
| 5,751,874 A | * | 5/1998 | Chudoba et al. ............... | 385/72 |
| 5,751,875 A | * | 5/1998 | Edwards et al. ............... | 385/84 |
| 5,761,360 A | * | 6/1998 | Grois et al. ................... | 385/81 |
| 5,781,681 A | | 7/1998 | Manning | |
| 5,809,192 A | * | 9/1998 | Manning et al. ............... | 385/78 |
| 5,862,282 A | * | 1/1999 | Matsuura et al. .............. | 385/86 |
| 5,892,871 A | * | 4/1999 | Dahan et al. .................. | 385/86 |
| 5,923,804 A | * | 7/1999 | Rosson ......................... | 385/81 |
| 5,923,805 A | * | 7/1999 | Anderson et al. .............. | 385/86 |
| 5,953,476 A | * | 9/1999 | Abe .............................. | 385/87 |
| 6,019,521 A | * | 2/2000 | Manning et al. ............... | 385/77 |
| 6,030,129 A | * | 2/2000 | Rosson ......................... | 385/81 |
| 6,254,283 B1 | * | 7/2001 | Novacoski et al. ............ | 385/78 |
| 6,287,018 B1 | * | 9/2001 | Andrews et al. .............. | 385/60 |
| 6,293,710 B1 | * | 9/2001 | Lampert et al. ............... | 385/78 |
| 6,318,905 B1 | * | 11/2001 | Valencia et al. ............... | 385/78 |
| 6,347,888 B1 | * | 2/2002 | Puetz ........................... | 385/53 |
| 6,354,746 B1 | * | 3/2002 | Lee .............................. | 385/77 |
| 6,367,984 B1 | * | 4/2002 | Stephenson et al. ........... | 385/53 |

FOREIGN PATENT DOCUMENTS

| | | | | |
|---|---|---|---|---|
| EP | 0130513 | * | 1/1985 | ............ G02B/6/24 |
| EP | 0491046 A A | | 6/1992 | |
| EP | 0927899 | * | 7/1999 | ............ G02B/6/38 |
| JP | 58011906 A | | 4/1983 | |
| WO | 97 198378 A A | | 5/1997 | |

OTHER PUBLICATIONS

European Search Report in SN EP 99 11 66 18.

* cited by examiner

*Primary Examiner*—David P. Bryant
*Assistant Examiner*—Essama Omgba
(74) *Attorney, Agent, or Firm*—Bugnion S.A.; John Moetteli

(57) ABSTRACT

The method provides for molding the rear end portion 4 of a tubular body 2 made of plastic material on an end portion 5 of a cable adaptor 6. The tubular body 2 has windows 10 formed in a front end portion 3 thereof. A coil spring 21 and a ferrule holder 13 having wings 19 are inserted through the front end portion 3 of the tubular body 2 and forced therethrough so that the wings 19 expand radially the front end portion 3 and the end walls 11 of the windows 10. When the wings 19 arrive in the windows 10, the end walls 11 and the front end portion 3 may re-contract radially so that the wings 19 may catch the end walls 11 under the bias of the coil spring 21.

11 Claims, 3 Drawing Sheets

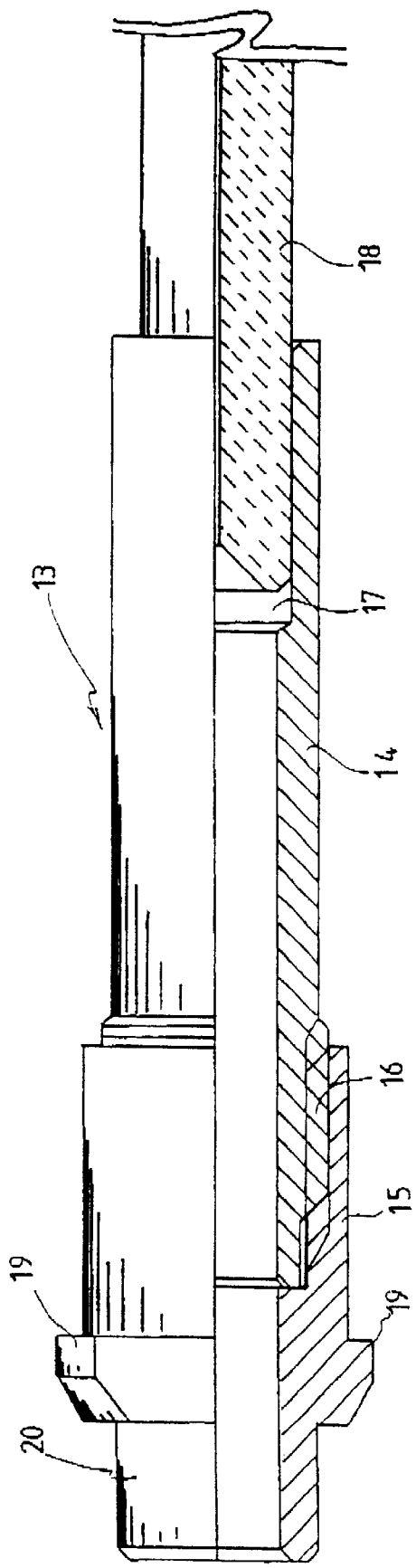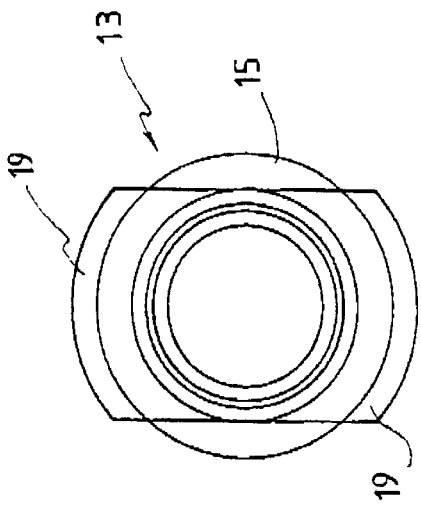
FIG. 3
FIG. 4

METHOD FOR MANUFACTURING A FIBRE OPTIC MALE CONTACT

BACKGROUND OF THE INVENTION

This invention relates to a method for manufacturing a fibre optic male contact comprising a tubular body made of plastic material, a cable adaptor having a first end portion fastened into a rear end portion of said body and a second end portion extending out of said rear end portion of the body, an elongated floating ferrule extending through a front end portion of said body to house an end portion of a fibre optic core, said ferrule assembled to a tubular ferrule holder movably housed in said body and having abutment means adapted to rest against shoulder means arranged in said body between the front and rear end portions thereof, and a coil spring biased between said first end portion of the cable adaptor and said abutment means of the ferrule holder to urge the abutment means of the ferrule holder against the shoulder means of the body.

Such fibre optic male contacts are commonly used for optically coupling optic fibres to each other, or to light sources or detectors for high speed communication and data transmission. They are of particular interest where a great number of fibres have to be installed in a single connector or insert because they avoid the difficulties of individually positioning and gluing the fibres in the connector, a major drawback being that the rupture of one single fibre requires the replacement of the whole assembly. The issue is, however, to miniaturise them as much as possible to achieve an acceptable compromise between the number of fibres installed in the connector and the size of the connector or insert.

In these fibre optic male contacts, the cable adaptor is necessary to support a sheath of strain relief material such as for example Kevlar (Trade Mark) surrounded by a plastic jacket crimped on the second end portion of the cable adaptor to reinforce the fibre optic core which extends from the floating ferrule through the tubular body and cable adaptor.

Currently, the tubular body has been made of metal or plastic material with its rear end portion machined so as to form an inner thread in which the threaded first end portion of the cable adaptor was screwed after insertion of the ferrule holder and spring into the rear end portion of the tubular body. This threading technique is expensive and, most of all, it is strongly limiting the possibilities of miniaturisation of the fibre optic male contact because of the need to have a tubular body with relatively thick walls to allow machining of a sufficiently resistant thread for assembly with the cable adaptor and the need to machine longitudinal grooves in the rear end portion of the tubular body to allow guiding and passage of the abutment means of the ferrule holder therethrough up to their reaching the shoulder means of the tubular body.

An improvement has been achieved by molding the tubular body with bayonet grooves formed in its rear end portion to allow a push and twist assembly with the correspondingly studded first end portion of the cable adaptor after insertion of the ferrule holder and spring into the rear end portion of the tubular body. This results in a less expensive manufacture but there is still the problem of miniaturisation because of the need to have sufficient wall thickness for the bayonet grooving in the rear end portion of the tubular body and the need to mold in the rear end portion of the tubular body longitudinal grooves to allow guiding and passage of the abutment means of the ferrule holder therethrough up to their reaching the shoulder means of the tubular body.

SUMMARY OF THE INVENTION

It is an object of this invention to avoid these drawbacks by means of a method for manufacturing a fibre optic male connector which is versatile and cost efficient while allowing a satisfactory miniaturisation.

According to a first aspect of the invention, there is provided a method for manufacturing a fibre optic male contact comprising a tubular body made of plastic material, a cable adaptor having a first end portion fastened into a rear end portion of said body and a second end portion extending out of said rear end portion of the body, an elongated floating ferrule extending through a front end portion of said body to house an end portion of a fibre optic core, said ferrule assembled to a tubular ferrule holder movably housed in said body and having abutment means adapted to rest against shoulder means arranged in said body between the front and rear end portions thereof, and a coil spring biased between said first end portion of the cable adaptor and said abutment means of the ferrule holder to urge the abutment means of the ferrule holder against the shoulder means of the body, characterized by the steps of molding said rear end portion of the tubular body on said first end portion of the cable adaptor, inserting said coil spring and ferrule holder through said front end portion of said tubular body, momentarily at least partly expanding radially said front end portion and shoulder means of the tubular body by forcible passage of the abutment means of said ferrule holder therethrough, urging said coil spring between said first end portion of the cable adaptor and said abutment means of the ferrule holder, allowing said front end portion and shoulder means of the body to radially re-contract after passage of said abutment means, allowing said abutment means to catch said shoulder means, and releasing said ferrule holder whereby the abutment means thereof may rest against said shoulder means under the bias of the coil spring.

Accordingly, by molding the rear end portion of the tubular body on the first end portion of the cable adaptor, a sturdy assembly is achieved between the first end portion of the cable adaptor and the rear end portion of the tubular body with a minimal wall thickness of the tubular body at that level. The first end portion of the cable adaptor is mechanically anchored in the rear end portion of the tubular body, thereby assuring safest assembly at that level. There are no material weakening and space consuming threads or bayonet groovings to assemble the cable adaptor, and there are no longitudinal grooves for passage and guiding of the abutment means of the ferrule holder through the rear end portion of the tubular body. Furthermore, by taking advantage of the intrinsic elasticity of the plastic material forming the tubular body to insert the coil spring and ferrule holder through the front end portion of the tubular body and momentarily expand the front end portion and shoulder means of the tubular body radially by forcing the abutment means of the ferrule holder therethrough, there is no need to have longitudinal space consuming grooves to allow guiding and passage of the abutment means of the ferrule holder therethrough. And by further taking advantage of the intrinsic elasticity of the plastic material forming the tubular body to allow the front end portion of the tubular body and shoulder means to radially re-contract after passage of the abutment means, it suffices then to release the ferrule holder to have its abutment means resting against the shoulder means of the tubular body under the bias of the spring, thereby completing the assembly. The manufacture is cost saving and easy, and most of all an extreme miniaturisation may be achieved.

Preferably, said rear end portion of said tubular body is molded on an indentated surface of the first end portion of the cable adaptor to achieve best assembly with a minimal thickness of the material forming the tubular body.

The shoulder means may be formed by end walls of windows molded in the tubular body with said abutment means being formed by radial protrusions of the ferrule holder respectively adapted to be housed in said windows. Preferably, two diametrically opposed windows are molded in the tubular body. Forming and function of the shoulder means is thus easy and safe while assuring easy insertion of the ferrule holder and abutment means thereof through the front end portion of the tubular body and momentary expansion thereof. The window and radial protrusion arrangement further assures anti-rotation of the ferrule holder in the tubular body and proper angular positioning of the fibre optic core therein. Furthermore, the windows increase elasticity of the tubular body, thereby facilitating expansion thereof for easy forcible passage of the radial protrusions of the ferrule holder therethrough.

In a preferred configuration, said front end portion of the tubular body comprises a plurality of longitudinal slots molded therein at equal angular distance from one another. And said front end portion of the tubular body preferably comprises four longitudinal slots molded therein. Such longitudinal slots further raise the elasticity of the tubular body for easy expansion thereof upon forcible passage of the abutment means of the ferrule holder therethrough. They also serve as guide means to assure angular positioning of the fibre optic male contact in an insert or connector for the purpose of eccentricity reduction in angled physical contact of the fibre optic core. Preferably, two of said slots are respectively aligned with said windows to further raise the elasticity of the tubular body at that level.

As an alternative, said shoulder means may be formed by an inner annular wall of the tubular body. Within this frame, said abutment means may be formed by a disc shaped portion of the ferrule holder.

Preferably, the ferrule holder is made of two parts screwed into one another, one bearing the abutment means and the other the ferrule.

These and other objects, features and advantages of the invention will become readily apparent from the following detailed description with reference to the accompanying drawings which show, diagrammatically and by way of example only, preferred but still illustrative embodiments of the invention.

BRIEF DESCRIPTION OF THE DRAWINGS

FIGS. 3 and 4 are respectively a longitudinal part section and a top plan view of the ferrule holder.

DETAILED DESCRIPTION OF THE PREFERRED EMBODIMENT(s)

Figure 1:
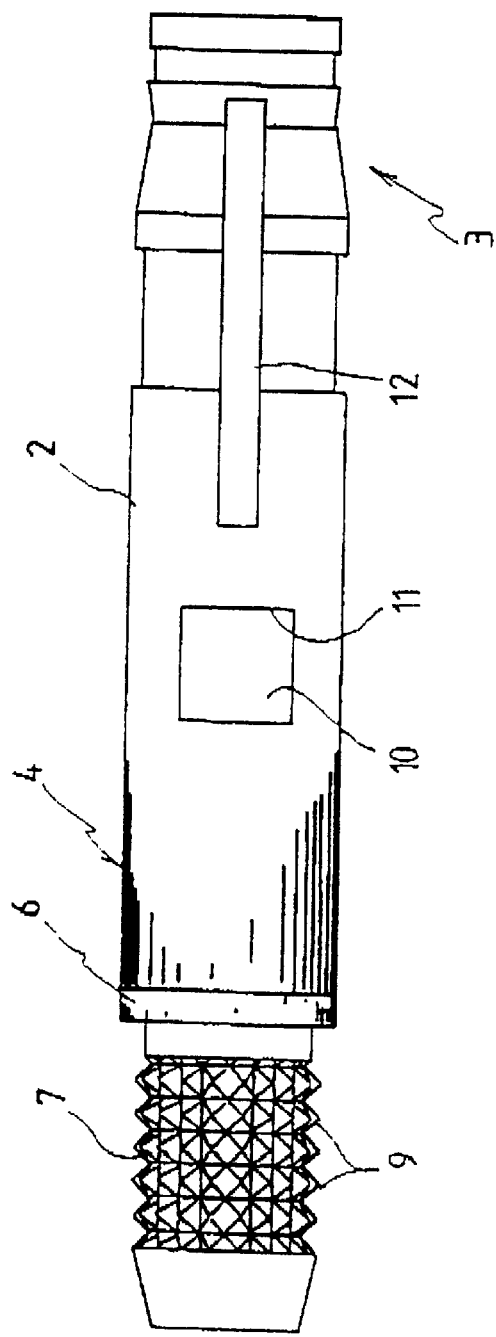
FIG. 1 is a longitudinal plan view of the tubular body.
Figure 2:
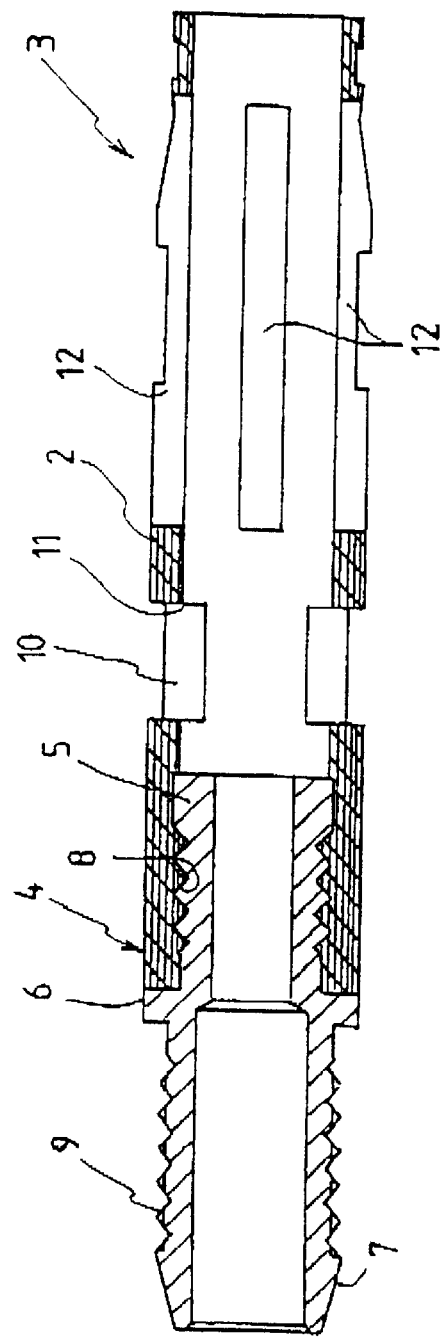
FIG. 2 is a longitudinal section of the tubular body.

The fibre optic male contact 1 (FIG. 6) comprises a tubular body 2 (FIGS. 1 and 2) made of plastic material and having a front end portion 3 and a rear end portion 4.

The tubular body 2 is injection molded with its rear end portion 4 molded on a first end portion 5 of a cable adaptor 6 a second end portion 7 of which extends out of tubular body 2. The first end portion 5 of the cable adaptor 6 has an indentated surface 8 for molded assembly in the tubular body. The second end portion 7 is also indentated as at 9 to provide support to a jacketed sheath of strain relief material (not shown) adapted to be crimped thereon.

Between the front and rear end 3 and 4 portions of tubular body 2 are molded two windows 10 in diametral opposition and the front end walls of which form shoulders 11.

The front end portion 23 of the tubular body 2 comprises four longitudinal slots 12 molded therein in diametrical opposition two by two, two of said slots 12 being respectively aligned with windows 11.

The ferrule holder 13 (FIGS. 3, 4) comprises a front segment 14 and a rear segment 15 which are screwed into one another as at 16. Front segment 14 comprises a longitudinal housing 17 in which is press fitted a cylindrical ferrule 18 adapted to house a fibre optic core (not shown).

Figure 5:
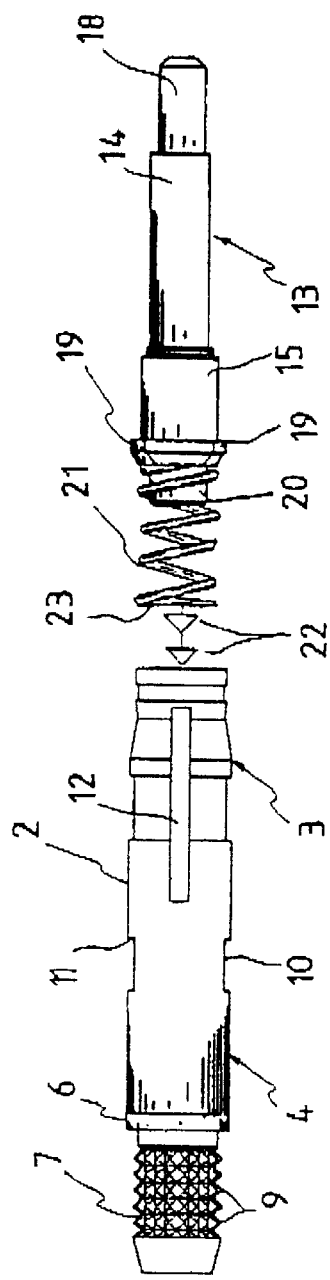
FIG. 5 is a longitudinal view of the tubular body with the coil spring and ferrule holder in position for insertion therein.
Figure 6:
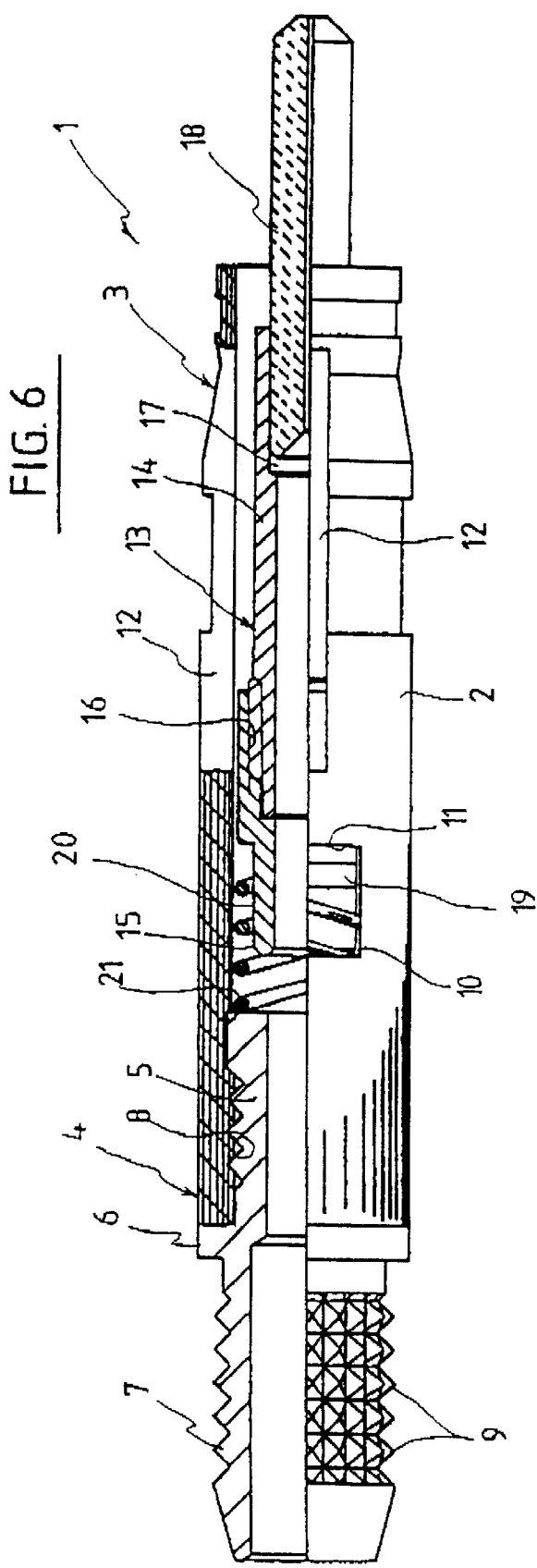
FIG. 6 is a part section of the tubular body with the ferrule, ferrule holder, and spring inserted therein.

The rear segment 15 of ferrule holder 13 comprises two diametrically opposed radial protrusions or wings 19 the outer diameter of which is larger than the inner diameter of the tubular body 2 and which are adapted to be housed in the windows 10 of the tubular body 2. Immediately preceding wings 19 is a stud portion 20 which has a smaller outer diameter than the wings 19, said studded portion being adapted to bear a coil spring 21 (FIGS. 5 and 6).

Assembly of the fibre optic male contact 1 is achieved as follows (FIGS. 5 and 6):

The ferrule holder 13 together with the coil spring 21 mounted on stud portion 20 is axially positioned in front of the front end portion 3 of the tubular body 2. The coil spring 21 and ferrule holder are then inserted through the front end portion 3 of the tubular body 2 and forced therethrough as shown by arrows 22. Forcible passage of the wings 19 of the rear segment 15 of ferrule holder 13 through the front end portion 3 momentarily expands radially and step by step the front end portion 3 and then the end walls 11 of windows 10. Simultaneously, wings 19 push coil spring 21, the free end 23 of coil spring 21 comes into contact with the first end portion 5 of the cable adaptor 6, and the coil spring 21 is compressed between first end portion 5 and wings 19. When the wings 19 arrive in the windows 10 after passage through the front end portion 3 and under end walls 11, the front end portion 3 and end walls 11 are allowed to radially re-contract and the wings may click into windows 10 and catch end walls 11. It suffices then to release the ferrule holder 13 so that the wings 19 may rest against the end walls 11 of windows 10 under the bias of coil spring 21. The ferrule holder is thus secured within the tubular body 2 with the ferrule 18 floating and extending through the front end portion 3 of tubular body 2.

Variants are available without departing from the scope of the invention.

For example, the number and relative positioning of windows 10 and longitudinal slots 12 may be different. The angular positioning of the longitudinal slots may also differ.

The windows 10 of the tubular body 2 may be replaced by an inner annular wall molded in the tubular body. In this case, the wings 19 of the ferrule holder may be replaced by a disc shaped portion formed on the rear segment 15 of the ferrule holder 13.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed:

1. A method for manufacturing a fibre optic male contact comprising a tubular body made of plastic material, a cable adaptor having a first end portion fastened into a rear end portion of said body and a second end portion extending out of said rear end portion of the body, an elongated floating ferrule extending through a front end portion of said body to house an end portion of a fibre optic core, said ferrule assembled to a tubular ferrule holder movably housed in said body and having abutment means adapted to rest against shoulder means arranged in said body between the front and rear end portions thereof, and a coil spring biased between said first end portion of the cable adaptor and said abutment means of the ferrule holder to urge said abutment means of the ferrule holder against the shoulder means of the body, the method characterized by the steps of:

- molding said rear end portion of the tubular body on said first end portion of the cable adaptor, said rear end portion being molded with substantially square windows which define said shoulder means and said rear end portion having a diameter comparable to that of the cable adaptor so as to minimize the size of the contact;
- inserting said coil spring and ferrule holder through said front end portion of said tubular body;
- momentarily at least partly expanding radially said front end portion and shoulder means of the tubular body by forcible passage of the abutment means of said ferrule holder therethrough;
- urging said coil spring between said first end portion of the cable adaptor and said abutment means of the ferrule holder;
- allowing said front end portion and shoulder means of the body to radially re-contract contract after passage of said abutment means;
- allowing said abutment means to catch said shoulder means; and,
- releasing said ferrule holder whereby the abutment means thereof may rest against said shoulder means under the bias of the coil spring.

2. A method according to claim 1, wherein said rear end portion of said tubular body is molded on an indentated surface of the first end portion of the cable adaptor.

3. A method according to claim 2, wherein said front end portion of the tubular body comprises a plurality of longitudinal slots molded therein at equal angular distance from one another.

4. A method according to claim 3, wherein said front end portion of the tubular body comprises four longitudinal slots molded therein.

5. A method according to claim 4, wherein two of the said slots are respectively aligned with said windows.

6. A method according to claim 3, wherein said ferrule holder is made of two parts screwed into one another, one bearing the abutment means and the other the ferrule.

7. A method according to claim 1, wherein said abutment means are formed by radial protrusions of the ferrule holder respectively adapted to be housed in said windows.

8. A method according to claim 7, wherein two diametrically opposed windows are molded in the tubular body.

9. A method according to claim 8, wherein two of the said slots are respectively aligned with said windows.

10. A method for manufacturing a fibre optic male contact comprising a tubular body made of plastic material, a cable adaptor having a first end portion fastened into a rear end portion of said body and a second end portion extending out of said rear end portion of the body, an elongated floating ferrule extending through a front end portion of said body to house an end portion of a fibre optic core, said ferrule assembled to a tubular ferrule holder movably housed in said body and having abutment means adapted to rest against shoulder means arranged in said body between the front and rear end portions thereof, and a coil spring biased between said first end portion of the cable adaptor and said abutment means of the ferrule holder to urge said abutment means of the ferrule holder against the shoulder means of the body, the method characterized by the steps of:

- molding said rear end portion of the tubular body on said first end portion of the cable adaptor, wherein said shoulder means are formed by an inner annular wall of the tubular body and said rear end portion has a diameter comparable to that of the cable adaptor so as to minimize the size of the contact;
- inserting said coil spring and ferrule holder through said front end portion of said tubular body;
- momentarily at least partly expanding radially said front end portion and shoulder means of the tubular body by forcible passage of the abutment means of said ferrule holder therethrough;
- urging said coil spring between said first end portion of the cable adaptor and said abutment means of the ferrule holder;
- allowing said front end portion and shoulder means of the body to radially re-contract after passage of said abutment means;
- allowing said abutment means to catch said shoulder means; and,
- releasing said ferrule holder whereby the abutment means thereof may rest against said shoulder means under the bias of the coil spring.

11. A method according to claim 10, wherein said abutment means are formed by a disc shaped portion of the ferrule holder.

* * * * *